(12) United States Patent
Lee

(10) Patent No.: US 7,742,679 B2
(45) Date of Patent: Jun. 22, 2010

(54) METHOD OF CHOOSING THE FIRST CANDIDATE TO BE LOADED FROM A SERIES OF JOB REQUESTS FOR A MIX MODE MULTIMEDIA PLAYER

(75) Inventor: Scot Lee, Hsin Tien (TW)

(73) Assignee: Via Technologies, Inc., Hsin Tien, Taipei Hsien (TW)

( * ) Notice: Subject to any disclaimer, the term of this patent is extended or adjusted under 35 U.S.C. 154(b) by 1005 days.

(21) Appl. No.: 11/490,089

(22) Filed: Jul. 21, 2006

(65) Prior Publication Data

US 2006/0257117 A1 Nov. 16, 2006

Related U.S. Application Data

(63) Continuation-in-part of application No. 11/186,814, filed on Jul. 22, 2005.

(60) Provisional application No. 60/590,335, filed on Jul. 23, 2004.

(51) Int. Cl.
*H04N 7/00* (2006.01)
*H04N 5/93* (2006.01)

(52) U.S. Cl. .......................... 386/46; 386/52

(58) Field of Classification Search .................. 386/46, 386/52, 55, 83, 68
See application file for complete search history.

(56) References Cited

U.S. PATENT DOCUMENTS 6,775,467 B1 * 8/2004 Su .............................. 386/125
2005/0289531 A1 * 12/2005 Illowsky et al. ............. 717/163

* cited by examiner

*Primary Examiner*—Robert Chevalier
(74) *Attorney, Agent, or Firm*—Thomas, Kayden, Horstemeyer & Risley

(57) ABSTRACT

A method for choosing the first candidate to be loaded from a series of job requests for a mix mode multimedia player is disclosed. A job table having a plurality of rows is provided. Each row for a job has a job message with a "Priority" status, a "Usage status" status, and an "Examining function" status. The jobs are generated by a loader manager module of the mix mode multimedia player according to the job requests. The job messages of the jobs are arranged according to the "Priority" status in order. Then, the first candidate is chosen according to the following steps. The "Usage status" status of the job message is examined. If the "Usage status" is "used", the "Examining function" status of the job message is examined. At last, If the "Examining function" status is "Critical", the job is set as the first candidate.

10 Claims, 3 Drawing Sheets

| Priority | Address | Status | Examining function |
|---|---|---|---|
| 1 | 100 ~ 150 | Used | X |
| 2 | 50 ~ 75 | Used | X |
| 3 | 160 ~ 192 | Used | Critical |
| 4 | 40 ~ 50 | Used | X |
| 5 | 80 ~ 92 | Used | X |
| 6 | 20 ~ 30 | Used | Average |
| 7 | 1 ~ 19 | Used | X |

Highest priority

METHOD OF CHOOSING THE FIRST CANDIDATE TO BE LOADED FROM A SERIES OF JOB REQUESTS FOR A MIX MODE MULTIMEDIA PLAYER

This application is a Continuation-In-Part of co-pending application Ser. No. 11/186,814 filed on Jul. 22, 2005, which claims priority under 35 U.S.C. §119(e) on U.S. Provisional Application Nos. 60/590,335 filed on Jul. 23, 2004, the entire contents of all of which are hereby incorporated by reference and for which priority is claimed under 35 U.S.C. §120.

FIELD OF INVENTION

The present invention is related to a mix mode multimedia player, particularly to a method of choosing the first candidate to be loaded from a series of job requests of a job table for the mix mode multimedia player.

BACKGROUND OF THE INVENTION

In 21-century, our amusements become more various than ever before. People can acquire information of scenic spots around the world or enjoy those pleasured and famous films at home just through a digital video disc (DVD) player. The DVD player plays the discs with extremely high quality to be good to hear and see as people are personal on the scene. People can get certain degree of satisfactions on scene organs without going to the theater. Still a further benefit is that people can repeat any section of the film which they want to see again without any restrictions.

Under the considerations of cost down and designing products with more capabilities in competitions, IC manufacturers endeavor to integrate their IC chips with more and more functions, such that a typical DVD player usually can play multimedia files in various formats recorded on a multimedia disc such as DVD, VCD, SVCD, CDR, CDRW etc. . . . For example, those file formats including MPEG, JPEG, MP3, MP4, and WAV, could be played by a conventional DVD player. However, the conventional DVD player cannot control playing operations of video and audio data independently, because those video and audio data are usually interleaving encoded in the conventional multimedia files. A user cannot control a conventional DVD player to a file with pure audio data; meanwhile to control the DVD player to play another file with pure video data. In other hand, a DVD player cannot play those files with pure video data while setting the files with pure audio format. If the DVD player cannot play the video and audio data separately or independently, the video data is played with interference when the audio data is set to be played at the same time, or the audio data is played with interference when the video data is set to be played at the same time. Moreover, a user want to set the video data to be played, but cannot set the audio data to be played at the same time. Moreover, it is also impossible for a user to set playing controls independently, such as stopping or pausing a current playing operation, or actuating a forward- or backward-winding operation on those of audio data or video data while the DVD player is just playing them.

An object of the present invention is to provide a mix mode multimedia player, which can play the audio format data and video format data by independently controlling without coupling. The present invention is particularly focus on the method of examining a job request to be loaded from many candidates on a job request table.

SUMMARY OF THE INVENTION

The present invention is to provide a method of choosing the first candidate to be loaded from a series of job requests for a mix mode multimedia player. The mix mode multimedia player comprises a loader manager module, a playback manager module, a file system module, and a presentation engine module. The job requests are issued by the presentation engine module. The method comprises the following steps:

At first, the loader manager module is in response to the job requests creating job messages. Each has information of Priority, Examining function, and Usage status. The default value of the Usage status is called as "Unused". Next, a job table is established by the loader manager module for arranging the job messages with its order in accordance with the Priority thereof. The row in the job table has job messages with the Usage status changed from "Unused" status to "Used" status. By choosing the first candidate processes, a job request with Priority i is newly issued. The loader manager module will arrange it into a corresponding position of the job table. When the positions of the job messages have already been occupied by the job messages, the new jobs are arranged in a job table and those job messages with Priority in order. The first candidate processes are chosen: (a) setting i=0; (b) setting i=i+1; (c) inquiring whether the Usage status of a $i^{th}$ job message is "Used" status; (d) if so, examine the Examining function of the $i^{th}$ job message, else, and go to step (b); (e) inquiring whether the $i^{th}$ job message has the Examining function; (f) when no Examining function is presented, the $i^{th}$ job message is set as the first candidate and go to step (b); (g) when the Examining function coded with "FULL" status and has no other job messages in the job table, await a new job message, or data consuming; (h) when the Examining function coded with "FULL" status and has other job messages, and goes to step (b); (i) when the Examining function is coded with "Middle" status, the job message is set as the first candidate and then go to step (b); (j) when the Examining function coded with "Critical" status, the job message is set as the first candidate at once and go to step (b).

Accordingly, the job messages are loaded according to their priority numbers arranged in descending order, but the orders with their priority numbers may be altered if a job message has an Examining function coded with "Critical", the job message will be promoted to the first priority to be loaded.

BRIEF DESCRIPTION OF THE DRAWINGS

The foregoing aspects and many of the attendant advantages of this invention will become more appreciated as the same becomes better understood by reference to the following detailed description, when taken in conjunction with the accompanying drawings, wherein.

DETAILED DESCRIPTIONS OF THE INVENTION

The present invention is to provide a method of choosing first candidate to be loaded from a series of job requests of a job table. By means of examining steps proposed by the present invention, the job can be loaded to ensure the playing of the video scene will not be stopped, because the playing of the audio scene is forced to be stopped or paused for the playing of audio scene.

Figure 1:
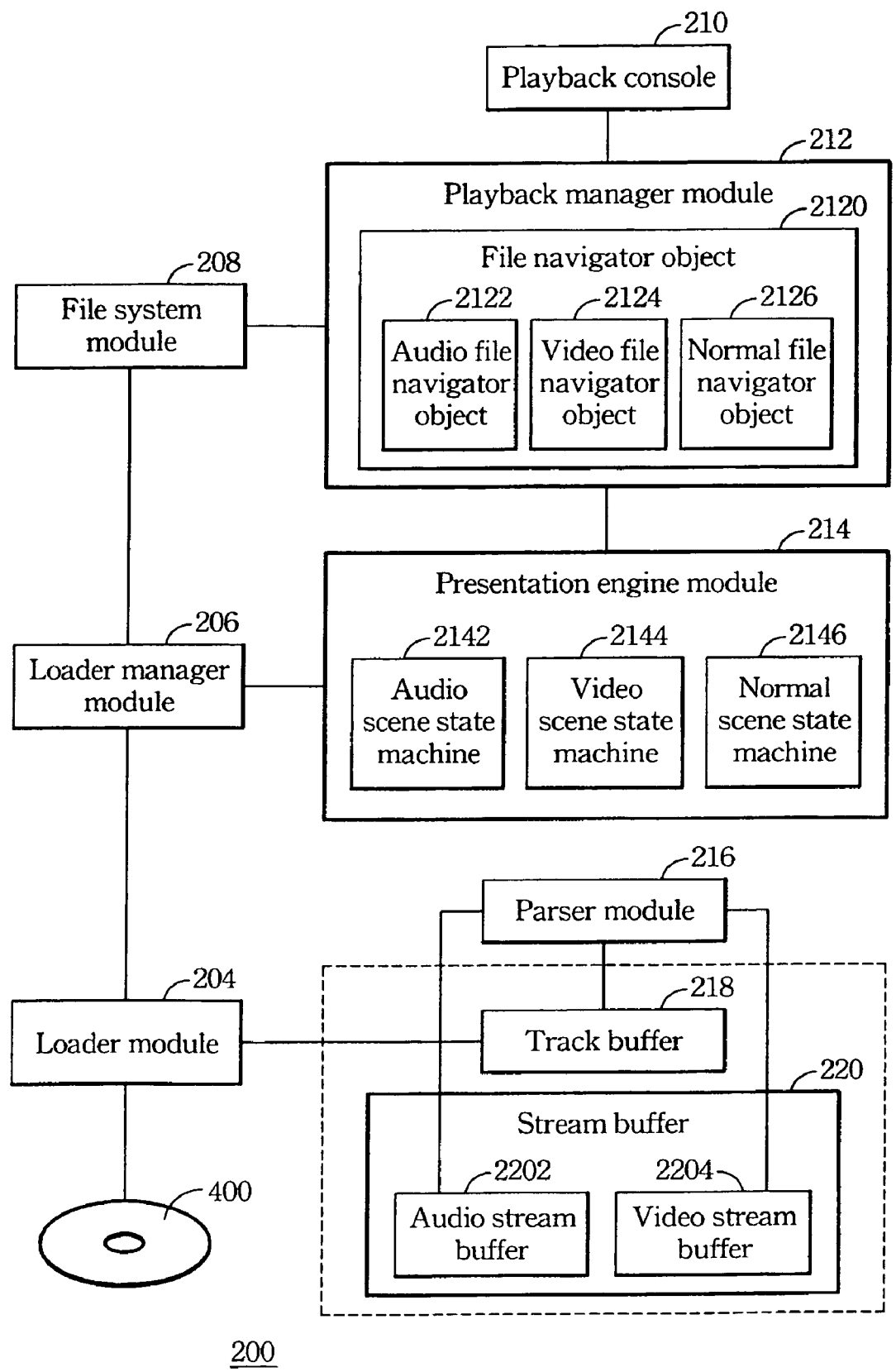
FIG. 1 shows function blocks of a mix mode multimedia player according to the present invention.

Referring to FIG. 1, it shows function blocks of a multimedia playback system 200 in accordance with a preferred embodiment of the present invention. The multimedia playback system 200 comprises a loader module 204, a loader manager module 206, a file system module 208, a playback console 210, a playback manager module 212, a presentation engine module 214, a parser module 216, a track buffer 218, and a stream buffer 220. The playback manager module 212 further includes a file navigator object 2120.

Preferably, the file system module 208 is to provide the playback manager module 212 with a plurality of files recorded on the media 400 with their file names and positions i.e. logical block addressing (LBA) allocation for the playback manager module 212 so that a user can arrange his favorite play list settings according to the file name on the playback console 210. Accordingly, the playback manager module 212 generates an audio format play list, a video format play list, and/or an audio-video interlaced play list according to user settings. The file navigator object 2120 processes the play lists and classify them to appropriate navigation modules including an audib file navigator object 2122, a video file navigator object 2124 and a normal file navigator object 2026.

The file navigator object 2120 serves as a role of arranging the playing sequence for a base reference of successive playing sequence in accordance with the audio play list and video play list in the playback manager module 212. The presentation engine module 214 includes an audio scene state machine 2142, a video scene state machine 2144, and a normal scene state machine 2146. The presentation engine module 214 provides the audio scene state machine 2142 according to the audio playing sequence of the audio file navigator object 2122. The file to be played has an audio format for user to operate the file independently. Besides, the presentation engine module 214 also provides the video scene state machine 2144 according to the video playing sequence of the video file navigator object 2124 to play those files containing video format.

In addition to the audio scene state machine 2142 and the video scene state machine 2144, the normal scene state machine 2146 is provided for playing those files having audio and video interlaced format. Furthermore, the presentation engine module 214 will issue a job request in accordance with the user command to the loader manager module 206. The loader manager module 206 responds a job message according to the job request. Generally, a job message includes information of an executing order of the file itself, a starting address, and an ending address of a file according to LBA of the media 400. In this embodiment, the information of an executing order includes "Usage status", "Priority", "Address", and "Examining function".

The Examining function can be classified as "Critical" status, "Middle" status and "Full" status. A job will be allocated firstly as it has the highest priority. The higher priority of a job has, the earlier it will be loaded. In an embodiment, a job message is provided without an Examining function, but the job message with Priority 1 will be arranged as the highest priority. Furthermore, the job message having an Examining function will be given with an appropriate priority according to its status. For example, the job message having "Critical" status of the Examining function is allocated with the highest priority. Moreover, the status of Examining function such as "Critical", "Middle" and "Full" may be changed so as to regulate the job's priority.

Since the file system module 208 manages the file catalog and each file location are provided with LBA of the media 400, the file navigator object 2120 will append file addresses to those files recorded by the file system module 208. When the presentation engine module 214 issues a job request to the loader manager module 206, the loader manager module 206 responds a job message and interposes it according to its priority into a job table (description later). Each job will be loaded by the loader module 204 for reading out the data from a specified address of the media 400 and dumped it into a track buffer 218. The data of the track buffer will be loaded into the parser module 216 to decode. The decoded data will be dumped into the stream buffer 220. In this embodiment, the stream buffer 220 includes an audio stream buffer 2202 storing the decoded audio data and a video stream buffer 2204 storing the decoded video data.

Figure 2:
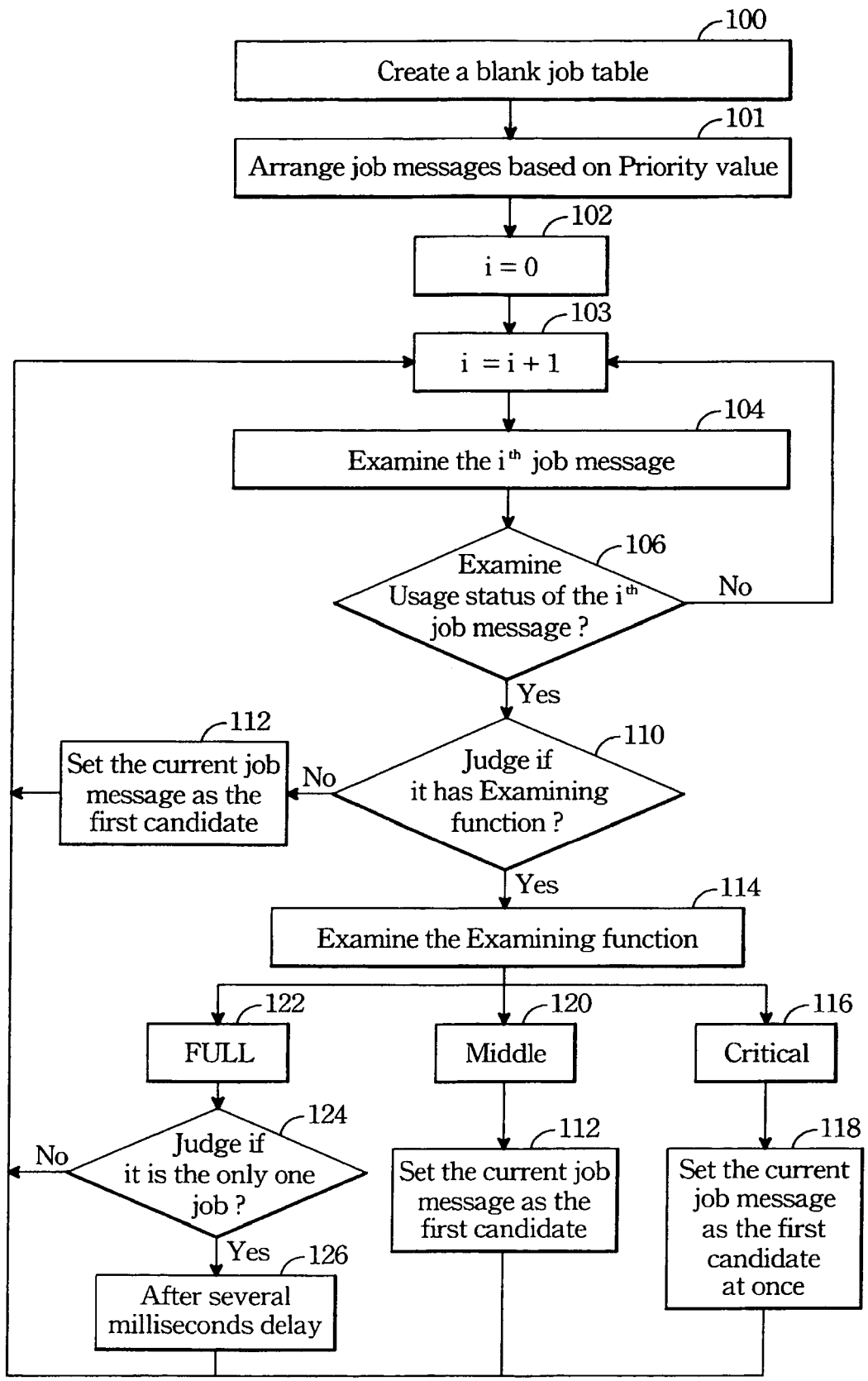
FIG. 2 shows a flow chart of choosing the first candidate to be loaded from a job table having several job messages for a mix mode multimedia player in accordance with the present invention.

FIG. 2 shows a flow chart for determining whether the loader manager module 206 make the job as the first candidate or a chosen candidate. The chosen candidate will be loaded by the loader module 204. Please refer to FIG. 2 in view of FIG. 3. In step 100, a job table includes several jobs with the corresponding priority. According to the corresponding priority, the jobs are allocated in order. Each job having its job message includes four fields: "Priority", "Address", "Usage status", and "Examining function". Each of the jobs has Priority, Address recorded from LBA of the media 400, Usage status, and Examining function. A blank job table is created without providing any job condition with Priority, Address recorded from LBA of the media 400, Usage status, and Examining function. The default status of the "Usage status" is "Unused" if no job message corresponding to the "Priority" field is occupied or the occupied job message had already been loaded by the loader module 204. The Usage status is changed from "Unused" to "Used" if a job message is occupied. The order of Priority is arranged by numeric value. The lower numeric value it has, the higher priority the job message owns. For example, when a job message owning a priority value such as Priority i is desired to be arranged into the job table, the corresponding "Usage status" is "Used", the job message will be arranged to the next row, and those original job messages with priority value >i will be automatically added by 1 to accommodate the new job message. The "Examining function" field may be marked with "X", "Critical", "Middle", or "Full". In case of the Examining function is "X", it means the job message without an Examining function. As forgoing description, the Address is provided by the file system module 208. The content provides information about corresponding location in the media 400.

In step 101, the loader manager module 206 interposed a job message with a corresponding file into the forgoing fields of a job table according to its priority. In step 102, initiate integral i (i=0). Next to step 103, set i=i+1. The Usage status of the $i^{th}$ row is examined (step 104) to judge its status (step 106). If the Usage status is "Unused", back to 103, the integral i is automatically added by 1. If the Usage status of row i is "used", goes forward to step 110. In step 110, judge whether the job has the Examining function or not. If the job message (job i) without an Examining function, the "Examining function" field is marked as "X" shown in FIG. 3. Proceeding to the step 112, after delaying for several milliseconds, sets the current job as the first candidate. If the job message (job i) with an Examining function, examines whether the Examining function has 'Full", "Middle", "Critical" status in step 114. According to the status of Examining function, the step may proceed to step 122 when the Examining function is "Full", the step may proceed to step 120 when the Examining function is "Middle", or the step may proceed to step 116 when the Examining function is "Critical".

In case of "Critical" status of step 116, the current job is immediately set as the first candidate to be loaded in step 118.

The loading procedure includes: the loader manager module 206 in response to the current message commands the loader module 204 to read the file of the corresponding job for playing.

In case of "Full", status of step 122, the job table is examined to judge if it is the only one job message in step 124. If it does, a period of time is delayed in step 126. The waiting time is to play, some of the data of the stream buffer 220. Afterward, the step is forward to step 103.

As shown in FIG. 2, when the examining function is "Full" and the job has other job messages in the job table, it goes to step 103 to process other job messages. When the examining function is "Middle", it goes to step 112 and then goes to step 103.

According to the present invention, the Examining function is to reflect the capacity of the stream buffer 220. The stream buffer 220 may be classified as three: (1) above 75%, (2) lower than 25%, and (3) in the middle of 25%-75% capacity of the file of the stream buffer, which corresponds to "FULL", "Critical", and "Middle" status of the Examining function, respectively. In a embodiment, the job request can be issued by the following modules: the file system module 208, the playback manager module 212, and the presentation engine module 214. The Examination function of the job message can reflect the user commands such as "Pause", "Stop", "Play", "Fast Forward", "Fast Reversed". For instance, the user command "Fast Forward" and "Fast Reversed" will cause the data in the stream buffer 220 soon be consumed and more job requests will be created.

Figure 3:
FIG. 3 shows an exemplary job table.

Accordingly, an exemplary job table shown in FIG. 3, the job in the 3$^{rd}$ row will be the first candidate to be loaded. Although it has the 3$^{rd}$ priority, it is allocated as the first candidate since the Examining function is "Critical". The original first priority job is descended by 1.

The present invention has at least the following advantages.

1. The present invention provides a method to examine whether the loader module should load the job from the job table according to its emergency condition in an optimum way.

2. The Examining function is in accordance with the current condition of the stream buffer, when the data in the stream buffer is going to be consumed. It can also be changed in response to the user command, thus it provides more flexible space for loader module.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

What is claimed is:

1. A method for choosing the first candidate to be loaded from a series of job requests for a mix mode multimedia player, the mix mode multimedia player comprising a loader manager module, a playback manager module, a file system module, and a presentation engine module, the method comprising the steps of:

providing a job table having a plurality of rows, wherein each row for a job has a job message with a "Priority" status, a "Usage status" status, and an "Examining function" status, and the jobs are generated by the loader manager module according to the job requests;

arranging the job messages of the jobs according to the "Priority" status in order, and choosing the first candidate in the following steps:
examining the "Usage status" status of the job message;
if the "Usage status" is "used", examining the "Examining function" status of the job message; and
if the "Examining function" status is "Critical", setting the job as the first candidate.

2. The method according to claim 1, choosing the first candidate further comprising: if the job has the job message without the "Examining function" status, setting the job with the "Usage status" status of the job message presented in "Used" as the first candidate.

3. The method according to claim 1, examining the "Examining function" status of the job message further comprising the "Examining function" status having "Full", "Middle", and "Critical" status, wherein the "Full" represents data in the stream buffer has over 75% capacity of the stream buffer, the "Critical" represents data in the stream buffer has less than 25% capacity of the stream buffer, and the "Middle" represents data in the stream buffer has between 25% and 75% capacity of the stream buffer.

4. The method according to claim 3, wherein the stream buffer further comprising an audio stream buffer and a video stream buffer.

5. The method according to claim 1, wherein the job message further comprising an "Address" status for presenting a position of the job.

6. A method for choosing the first candidate to be loaded from a series of job requests for a mix mode multimedia player, the method comprising the steps of:

providing a plurality of jobs according to a plurality of job requests having a plurality of job messages, wherein each of the job messages has a "Priority" status, a "Usage status" status, and an "Examining function" status;

arranging the job messages of the jobs according to the "Priority" status in order, and choosing the first candidate in the following steps:
examining the "Usage status" status of the job message;
if the "Usage status" is "used", examining the "Examining function" status of the job message; and
if the "Examining function" status is "Critical", setting the job as the first candidate.

7. The method according to claim 6, choosing the first candidate further comprising: if the job has the job message without the "Examining function" status, setting the job with the "Usage status" status of the job message presented in "Used" as the first candidate.

8. The method according to claim 6, examining the "Examining function" status of the job message further comprising the "Examining function" status having "Full", "Middle", and "Critical" status, wherein the "Full" represents data in the stream buffer has over 75% capacity of the stream buffer, the "Critical" represents data in the stream buffer has less than 25% capacity of the stream buffer, and the "Middle" represents data in the stream buffer has between 25% and 75% capacity of the stream buffer.

9. The method according to claim 8, wherein the stream buffer further comprising an audio stream buffer and a video stream buffer.

10. The method according to claim 6, wherein the job message further comprising an "Address" status for presenting a position of the job.

* * * * *